United States Patent [19]
Ballu

[11] 3,883,073
[45] May 13, 1975

[54] OSCILLATING SPRAYING APPARATUS

[75] Inventor: Vincent Pierre Marie Ballu, Epernay, France

[73] Assignee: Tecnoma, Epernay, France

[22] Filed: July 5, 1973

[21] Appl. No.: 376,391

[30] Foreign Application Priority Data
July 7, 1972   France .............................. 72.24659

[52] U.S. Cl. .................................. 239/77; 239/227
[51] Int. Cl. ........................ B05b 3/00; B05b 17/00
[58] Field of Search ........................ 239/77, 78, 227

[56] References Cited
UNITED STATES PATENTS
2,551,789   5/1951   Copley .............................. 239/77 X
2,613,109   10/1952   Walker .................................. 239/77
3,128,036   4/1964   McBride ........................... 239/77 X
3,269,657   8/1966   Ballu ..................................... 239/77
3,655,130   4/1972   Patrick ................................. 239/77

FOREIGN PATENTS OR APPLICATIONS
661,254   11/1951   United Kingdom .................. 239/77

Primary Examiner—Robert S. Ward, Jr.
Attorney, Agent, or Firm—Imirie, Smiley & Linn

[57]  ABSTRACT

The apparatus comprises a mechanical sprayer carried by a pivotal casing driven in an oscillatory motion by an engine and transmission means. The fan of the sprayer is itself driven through two bevel gears and connected with a shaft that is coaxial with the pivotal axis of the casing.

23 Claims, 7 Drawing Figures

OSCILLATING SPRAYING APPARATUS

The present invention relates to a new spraying apparatus, especially designed for the treatment of crops, and relates more particularly to spraying units comprising a fan or a blower and which can be oscillated during its movement. There is thus provided a regular treatment of a large ground area at each passage of a vehicle carrying said spraying unit.

According to the invention, the spraying unit is carried by a hollow column, at least a section thereof is pivotally mounted on an axis concentrical to the rotation axis of a shaft placed in said column and connected to at least one bevel gear transmitting to said shaft a motion from a driving shaft and said pivoting section is connected to an adjustable oscillating hydraulic motor.

Various other characteristics of the invention are moreover shown in the following detailed description with reference to the accompanying drawings.

DETAILED DESCRIPTION OF THE INVENTION

Figure 1:
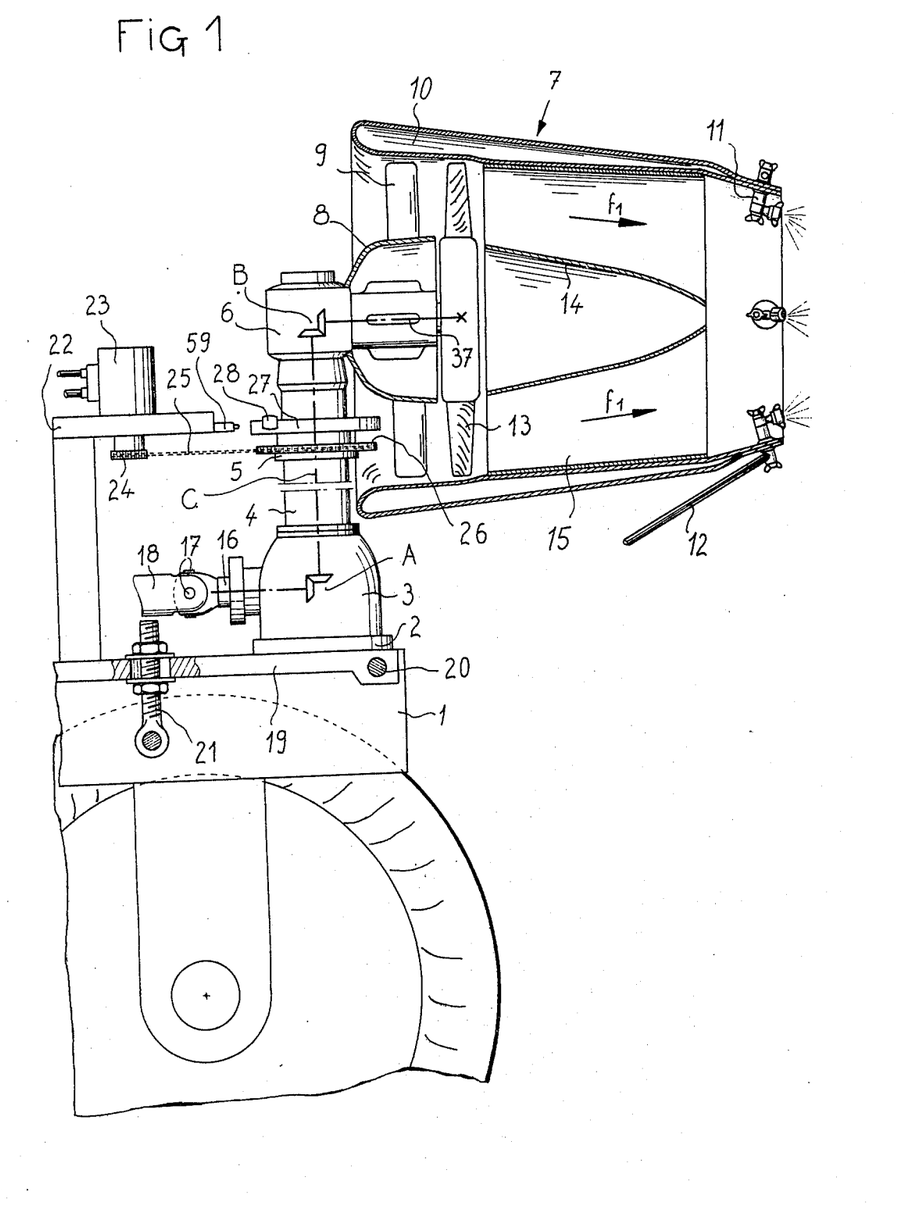
FIG. 1 is a partly sectional diagrammatic elevation view of the spraying apparatus of the invention.

FIG. 1 shows the apparatus mounted on a tractor, although the apparatus could, of course, be mounted in the same manner as on a trailer.

At the base thereof, the apparatus comprises a supporting shoe 2 for a casing 3, rigidly fixed on said shoe 2 and supporting a tubular member 4 which, advantageously, is removably mounted as hereinafter described with reference to FIG. 2. At its upper portion the member 4 delimits a bearing collar 5 on which is placed a second casing 6 rotatable on said bearing collar 5.

The second casing 6 supports a spraying unit 7 which, advantageously, is removably mounted. The spraying unit 7 comprises a hub 8 mounted on the casing 6 and comprising leading blades 9 surrounded by a tapered envelope 10.

Spraying nozzles 11 are placed at the outlet of the envelope 10 and are fed through flexible tubes 12.

The envelope 10 also surrounds an axial flow fan 13 placed at the end of the hub 8 and upstream of an ogive 14 supported by vanes 15 connecting it to the envelope 10 with which said ogive forms an ejection nozzle for the air blown in direction of arrows $f_1$ by the fan 13.

The casings 3 and 6 respectively contain bevel gears A and B connected through a shaft C.

The input pinion of the bevel gear A is driven through a shaft 16 preferably connected, through an universal joint 17, for example a Cardan joint, to a driving shaft 18 connected in turn to the output shaft of a separate engine or to the force intake or power take off of the tractor 1.

By providing the universal joint 17 to drive the shaft 16, it becomes possible to place the shoe 2 on a plate 19 hinged on a spindle 20 and having the possibility to be operated through a control member 21, for example a screw-jack or an hydraulic jack, which enables adjustment, as desired, the angle made by the apparatus with the tractor and consequently to more or less incline the spraying unit 7 with respect to the ground.

Figure 2:
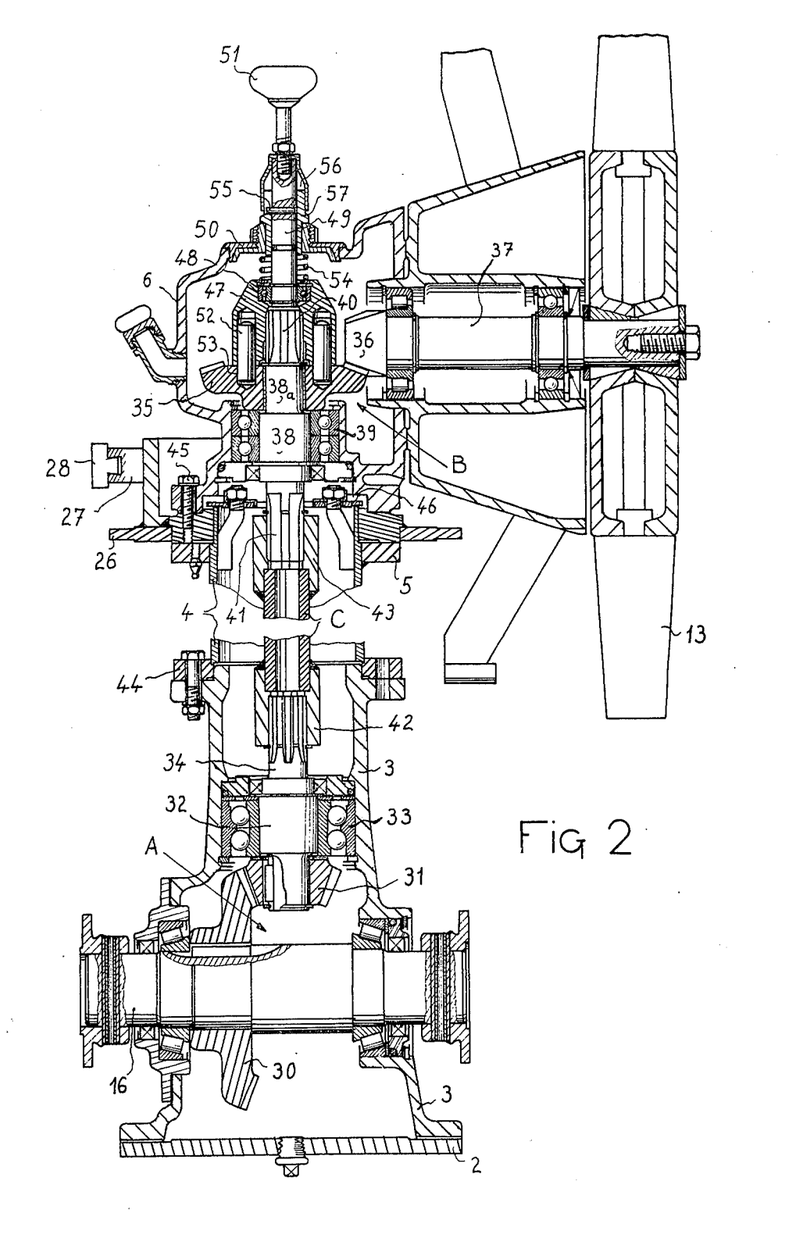
FIG. 2 is an enlarged fragmentary sectional view of the apparatus of FIG. 1.

The plate 19, or directly the frame 1, if said plate 19 has not been provided supports a plate 22 on which is placed an oscillating hydraulic engine 23 having an output shaft 24 which is connected by a chain 25 to a sprocket wheel 26 which, in the embodiment of FIGS. 1 and 2, is angularly secured the casing 6.

Figure 5:
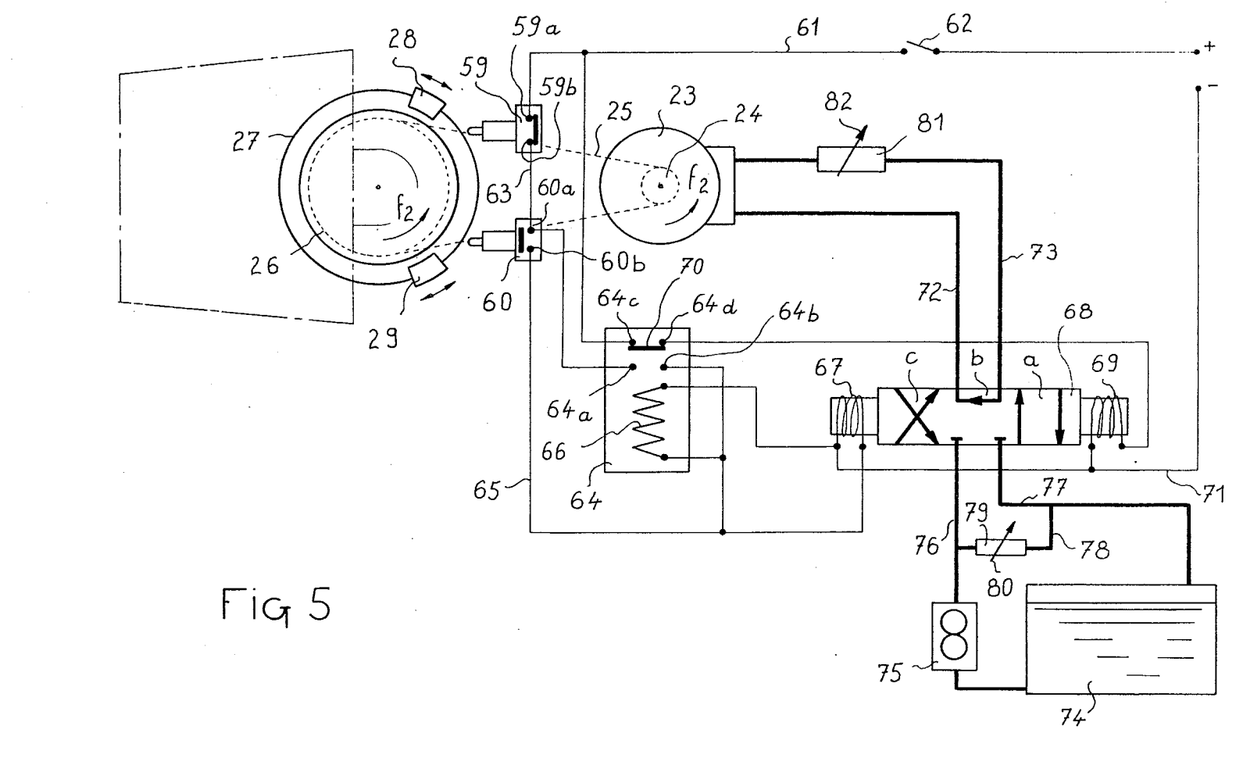
FIG. 5 is a diagram of an electro-hydraulic circuit showing a preferred embodiment according to the invention for the control of the oscillating motion of the apparatus of the invention.

The casing 6 also supports a collar 27 carrying two cams 28, 29 as particularly shown in FIG. 5. The cams 28, 29 are movably mounted on the collar 27 and, for example as diagramatically shown in FIG. 2, are slidable along said collar. As shown hereinafter, said cams enable an adjustment of the oscillating motion amplitude of the casing 6 and consequently to the spraying unit 7.

FIG. 2 shows a preferred embodiment of the assembly comprising the casings 3, 6 and the tubular member 5. It is to be noted that the bevel gear A is constituted by a couple between bevel pinions 30, 31; the pinion 31 being of a smaller diameter and constitutes a step-up gear and being mounted at end of a shaft 32 mounted in a bearing 33, said shaft 32 comprising a splined end 34 at its end opposite the end supporting the pinion 31.

In a somewhat similar manner the bevel gear B comprises a conical couple between bevel pinions 35, 36; the driving pinion 35 also forms a step-up gear for the motion transmitted through the pinion 36 to a shaft 37 at the end of which is secured the helical fan 13.

The pinion 35 is loosely placed on a smooth bearing 38 a of a shaft 38 mounted in a bearing 39. The two ends of the shaft 38 are provided with splined ends 40 and 41.

The splined ends 34 and 41, of the shafts 32 and 38 are engaged in splined sleeves 42, 43 on the ends of shaft C. Thus, said shaft C can easily be changed at the same time as the tubular member 4 to adjust the height to which must be placed the spraying unit 7. Actually, the member 4 is only supported on the casing 3 by a flanged 44, and the collar 5 on the upper end of the tubular member 4, forms a bearing surface for the sprocket wheel 26 on which is directly fixed by bolts 45 a lower flange of the casing 6. A removable retaining ring 46 prevents extraction of the casing 6.

The splined end 40 is utilized to drive a bell 47 mounted by a bearing 48 on a slidably mounted rod 49 guided in a cover 50 and which can be operated by means of a control member 51. The bell 47 supports direct drive dog clutches 52 normally engaged in apertures 53 of the angle pinion 35. A spring 54 normally holds the bell 47 in a position at which it is driven.

From the above disclosure it is noted that by lifting the shaft 49 through the control member 51, the bell 47 is also lifted and, consequently at the same time the direct driven dog-clutches 52 are removed from the apertures 53 which frees the pinion 35 to stop the drive of the fan 13.

The possibility of freeing the pinion 35 enables use of the spraying nozzles 11 without dismounting and it is also possible, to easily change the spraying unit 7 to replace it by a powder spraying device or a unit of another type, for example a hose.

To prevent accidental reconnection of the pinion 35, it is advantageous that the rod 49 be provided, at the end thereof, with a locking device. Said locking device may, for example, comprise a finger 55 which can be brought, when said rod is raised in a slot 56 of a sleeve 57 surrounding the rod 49 and supported by the cover 50.

Figure 3:
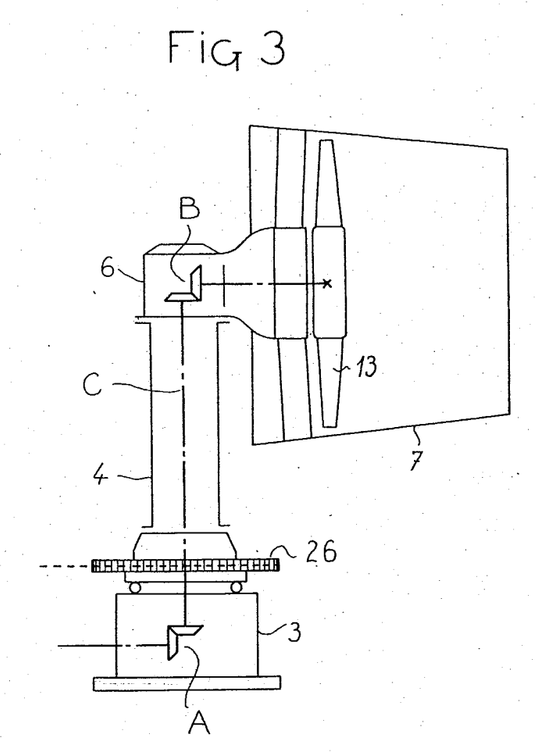
FIGS. 3 and 4 are diagrammatic sectional elevation views similar to FIG. 1 and showing two variants.

FIG. 3 shows a first variant wherein the tubular member 4 is rotatively fixed to the casing 6 to rotate with said casing and, in that case, the sprocket wheel 26 is placed beneath the member 4 to rotate therewith in relation to the casing 3.

This arrangement enables the change of the tubular member 4 and shaft C without modifying the height of the plate 22 supporting the hydraulic engine 23 of FIG. 1.

Figure 4:
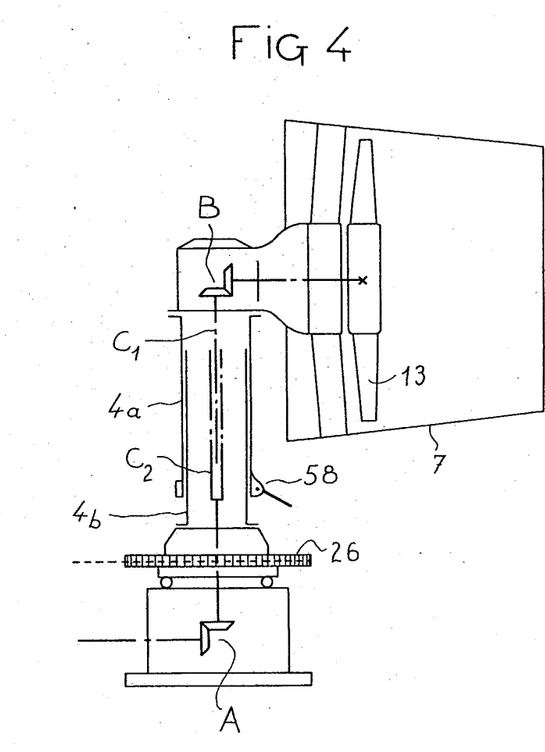

Another variant appears in FIG. 4 wherein the tubular member 4 is constituted by two telescopic parts 4a, 4b which can be locked in relation with each other in selected positions by means of a lock 58 which can be constituted by various structures, for example by a belt tightened on the section 4b by a screw device or by a jack.

In a similar manner, the shaft C is constituted in two splined, telescopic sections $C_1$ and $C_2$. Through these means, it is possible to adjust the height of the spraying unit 7 without dismounting and while taking care that said spraying unit is always placed at the best height for the treatment of given crops.

FIG. 5 shows a preferred embodiment controlling of the oscillating motion of the spraying unit 7. Two micro-switches 59, 60, one of which is shown in FIG. 1, are mounted on the plate 22 on the path of the cams 28, 29. The micro-switch 59 is normally closed, while the micro-switch 60 is normally open. The studs 59a, 59b are thus normally electrically connected to a current supply line 61 controlled by a main switch 62. The stud 59b is, on the other hand, connected through a line 63 to the stud 60a of the micro-switch 60 and is also connected to the terminal 64a of a inverter relay 64 comprising four terminals 64a, 64b on one hand, and 64c, 64d on the other hand. The second stud 60b of the micro-switch 60 is connected, through a conductor 65, to the terminal 64b of the inverter relay 64, to one end of the winding 66 of said relay, and to one end of a winding 67 controlling an hydraulic distributor 68 which comprises a second controlling winding 69.

The blade 70 of the inverter relay 64 normally connects the terminals 64c and 64d which are respectively connected to the current supply line 61, and to one end of the winding 69 of the distributor 68. The second ends of the windings 66 of the inverter relay 64 and of the windings 67 and 69 of the distributor 68 are connected together and to a return wire 71.

The slide of the distributor 68 comprises three circuits $a$, $b$, $c$, and this slide is normally placed in a neutral position for which the circuit $b$ connects the inlet and outlet ducts 72 and 73 of the hydraulic engine 23 whose circulation circuit is thus blocked. The fluid to be supplied to the engine 23 is pumped from a tank 74 by a pump 75 and this fluid is directed towards the distributor 68 by a duct 76, said fluid being returned to the tank 74 by means of a duct 77, after having circulated in the pump when the distributor is in its working position.

A by-pass circuit 78 is connected between the ducts 76 and 77, and this by-pass circuit is controlled by a flow limiting device 79 comprising an adjustment handle 80.

A second flow limiting device 81 which can be adjusted by a handle 82 is also placed in the duct 73, i.e., in the circuit of the engine 23 and this device is provided to restrain in a selected direction the fluid circulating. The precludes the effects of a torque exerted on the shaft C and tending to rotate the spraying unit in one way when said shaft C rotatively drives the shaft 37 and, thus, the fan 13.

When the pump 75 is actuated and the distributor 68 is in its neutral position $b$, the fluid returned by the pump is directed to the tank 74 while passing through the by-pass circuit 78. In this position $b$, the inner circuit of the hydraulic engine 23 is closed so that the engine 23 cannot rotate. The output shaft of the engine is immobilized and, consequently, the sprocket wheel 26 prevents oscillating motion of the spraying unit 7, regardless of its angular position. Nevertheless, the fan 13 can be driven and continue operation of the spraying unit 7 in its fixed position.

When it is desired to oscillate the spraying unit 7, the main switch 62 is closed. Thus, current is supplied through the line 61 to the terminal 64c of the inverter relay, and passes through the blade 70 and the terminal 64d to the winding 69; so that the distributor is brought to the working position $a$ for which the ducts 72 and 76 are connected together, while the ducts 73 and 77 are also connected together.

The fluid returned by the pump is brought by the ducts 76 and 72 to the engine 23 which thus rotates in the direction of arrow $f_2$, driving in the same direction the sprocket wheel 26a and the spraying unit 7.

The angular amplitude of this motion depends on the position of the cam 29. In fact, when the cam 29 operates the micro-switch 60, its studs 60a, 60b are connected and the current from the line 61 then passes through the micro-switch 60 and is supplied through the line 65, on one hand, to the winding 66 of the inverter relay 64 and, on the other hand, to the winding 67 of the distributor 68.

Energizing the winding 66 of the relay results in positioning the blade 70 across the terminals 64a, 64b while cutting off the supply to the winding 69 which was made by the terminals 64c, 64d.

Feeding the winding 67 results in bringing the distributor in a working position $c$. Consequently, in this case the duct 76 is connected to the duct 73 and the duct 77 is connected to the duct 72, which corresponds to an operation of the engine 23 in a direction opposite to that of the arrow $f_2$ and, consequently, to rotation of the spraying unit in a direction opposite to that obtained for the working position $a$.

As soon as the cam 29 has released the micro-switch 60, the circuit between the contacts 60a, 60b is again open but the inverter relay 64 is then auto-energized since its winding 66 keeps on being supplied by the current passing through the micro-switch 59 and brought by the line 63 to the stud 60a electrically connected to the terminal 64a of the inverter relay.

The motion opposite to the arrow $f_2$ continues until the cam 28 operates the micro-switch 59. In fact, at this moment, said micro-switch is open, and consequently the winding 66 of the inverter relay 64 is deenergized. This causes the blade 70 to drop and return to the position in which it connects the terminals 64c, 64d. Thus the above considered operating conditions for rotation in direction of the arrow $f_2$ are restored.

If it is desired to stop the above described reciprocating oscillating motion it is only necessary to turn off the main switch 62, which immediately stops the supply to the windings 67 or 69 of the distributor 68 which was under voltage and, consequently, the distributor is brought back to the neutral position b.

From the above disclosure, it is apparent that the amplitude of the oscillating motion is adjustable by a simple movement of the cams 28, 29 on the plate 27 supporting them. Besides, the periodicity of said motion can, also, be adjusted as required, in operating through the handle 80 on the flow of the by-pass circuit 78. In fact, the tank 74 then receives a more or less great amount of fluid returned by the pump 75 which causes the concomitant adjustment of the amount of fluid brought to the engine 23.

The control of the oscillating motion of the spray unit 7 which has been described with reference to FIG. 5 is of an electromechanical type. The invention also encompasses control by any other means, and typically by any logical circuit providing the above described functions.

Figure 6:
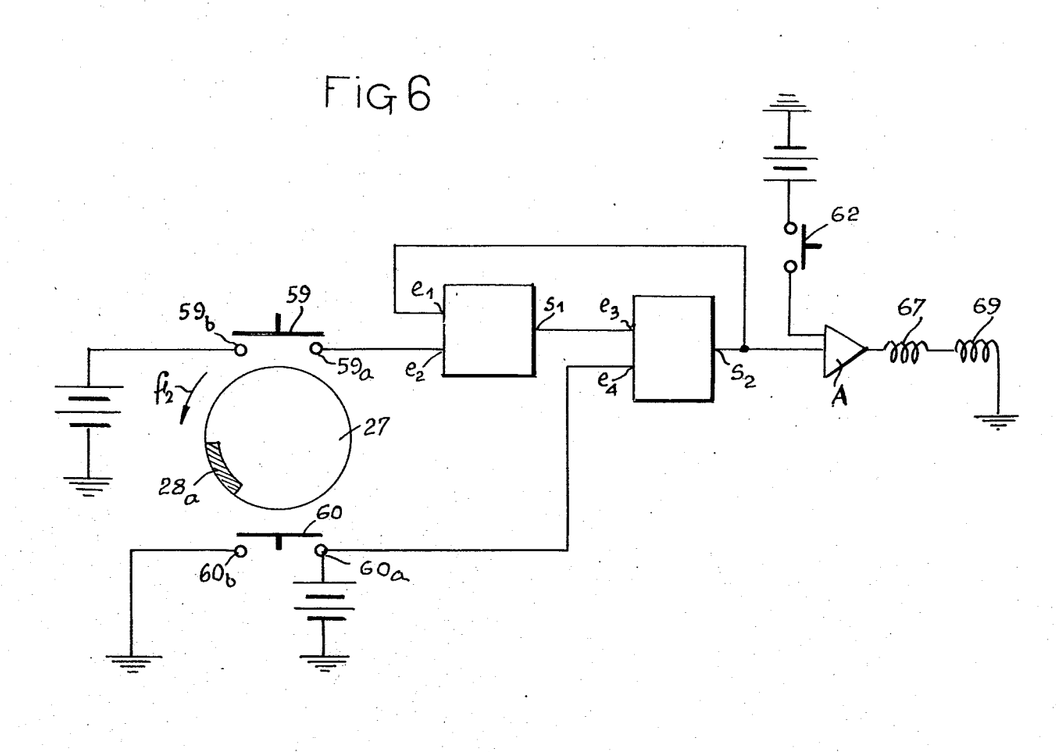
FIGS. 6 and 7 are diagrams of logical circuits for controlling the apparatus.

In this respect FIG. 6 shows a typical logical circuit which comprises:

the micro-switch 59 which is normaly closed, with its terminal 59b connected to a power-source in order to be at a logical state 1 and its terminal 59a connected to one input $e_2$ of an OR gate, the micro-switch 60 which is normaly open, with its terminal 60b for example to the ground in order to be at a logical state 0 and its terminal 60a connected to a power-source in order to be at a logical state 1, the terminal 60a being moreover connected to one input $e_4$ of an AND gate, the output $s_1$ of the OR gate connected to the input $e_3$ of the AND gate, the output $s_2$ of the AND gate is connected to the input $e_1$ of the OR gate, said output $s_2$ being moreover connected to one input of an amplifier A, the power supply of which being provided from a power source through the general switch 62, the output of the amplifier A is connected to the windings 67, 69 of the distributor 68 shown as serialy connected.

For the working conditions which have been hereinbefore described the collar 27 of the preceding figures comprises in FIG. 6 at least one control means 28a similar to one of the cams 28 or 29. The control means 28a may advantageously be a magnet if it is provided to use magnetic control elements for the micro-switches 59, 60.

In the case of FIG. 6, the inputs $e_2$ and $e_4$ are at a state 1. The output $s_1$ is then at a state 1 so that the output $s_2$ is at the state 1. This corresponds to a supply of the windings 67, 69 in one direction and consequently to bringing the slide 68 of the distributor of FIG. 5 in the working position a, for example, whereby the collar 27, and the magnet 28a rotate in the direction of arrow $f_2$.

When the magnet 28a rotates according to the arrow $f_2$, at a given time the micro-switch 60 is closed and the states of the OR and AND gates are the following: $e_2 = 1$, $s_1 = 1$, $e_3 = 1$, $e_4 = 0$, $s_2 = 0$. Consequently, the windings 67, 69 are supplied in the other direction and the distributor is brought to the working position b wich provides rotating of the collar 27 in a direction opposite to that of arrow $f_2$.

Then, the magnet 28a opens the micro-switch 59. At this time the states of the OR and AND gates are the following: $e_2 = 0$, $e_1 = 1$, $s_1 = 1$, $e_3 = 1$, $e_4 = 1$ and $s_2 = 1$ which corresponds to a control of the distributor bringing back said distributor in the working position a whereby the collar 27 rotates in direction of arrow $f_2$.

Practically, it is often of interest to use NAND gates which may be supplied from the vehicle storage battery. The corresponding embodiment is shown in FIG. 7 which comprises two micro-switches $59_1$, $60_1$ of the dry reed relay type and two control magnets $28_1$ et $29_2$ which may be moved along the periphery of the ring 27 in a very same way as what as been previously described in reference to FIG. 5.

Figure 7:
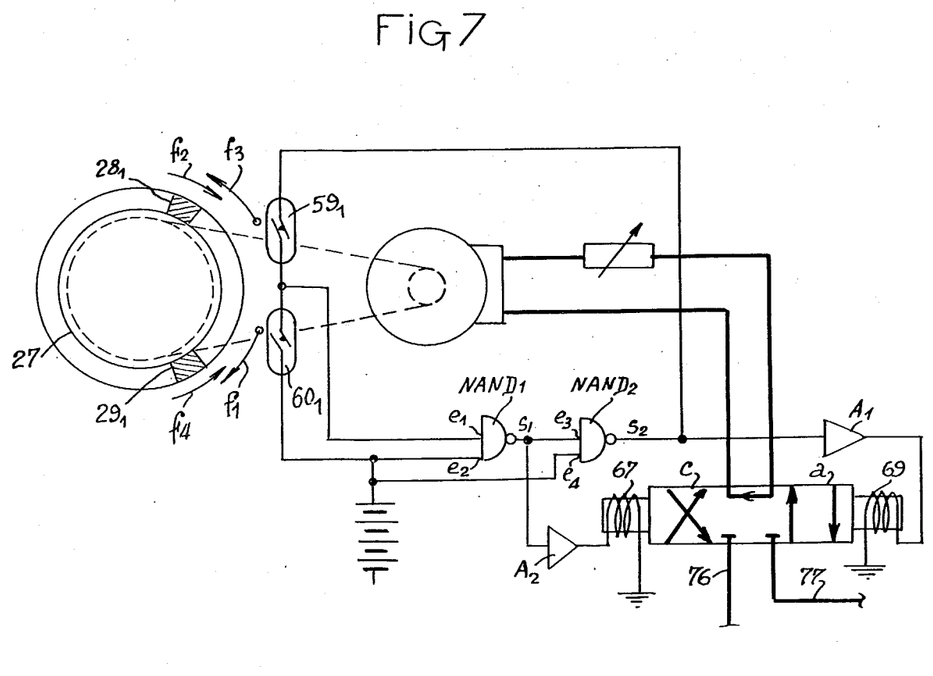

According to FIG. 7, the two micro-switches $59_1$, $60_1$ are in series and connected on one hand at the input $e_2$ of a NAND 1 gate and on the other hand at the output $s_2$ of a NAND 2 gate and at the input of a first amplifier $A_1$ supplying the winding 69.

The output $s_1$ of the NAND 1 gate is connected to the input of a second amplifier $A_2$ supplying the winding 67. The common point of the micro-switches $59_1$ and $60_1$ is connected to the input $e_1$ of the NAND 1 gate of which the output $s_1$ is also connected to the input $e_2$ of the NAND 2 gate as well as to the amplifier $A_2$.

The inputs $e_2$ and $e_4$ of the gates are besides connected to suitable power-sources in order to be always at a logical state 1.

Under those circumstances, the working of the apparatus is according to the following table.

|  |  | NAND 1 | | | NAND 2 | | | | |
| --- | --- | --- | --- | --- | --- | --- | --- | --- | --- |
|  |  | $e_1$ | $e_2$ | $s_1$ | $e_3$ | $e_4$ | $s_2$ | $A_1$ | $A_2$ | direction |
| $59_1$ | closed |  |  |  |  |  |  |  |  |  |
| $60_1$ | closed | 1 | 1 | 0 | 0 | 1 | 1 | 1 | 0 | $F_1$ |
| $59_1$ | closed |  |  |  |  |  |  |  |  |  |
| $60_1$ | open | 1 | 1 | 0 | 0 | 1 | 1 | 1 | 0 | $F_2$ |
| $59_1$ | open |  |  |  |  |  |  |  |  |  |
| $60_1$ | open | 0 | 1 | 1 | 1 | 1 | 0 | 0 | 1 | $F_3$ |
| $59_1$ | closed |  |  |  |  |  |  |  |  |  |
| $60_1$ | open | 0 | 1 | 1 | 1 | 1 | 0 | 0 | 1 | $F_4$ |

It should be noted that the motor 23 can be replaced by a simple or double-acting jack connected by a crank, a rod or any suitable kinematical system, to the casing 6 or to the tubular member 4. In such a case, the stops 28, 29 are carried by one of the movable elements of said kinematical system to operate the micro-switch 59, 60. Also, the spraying unit 7 can comprise a centrifugal turbine and, in this case, it is advantageous that said turbine be placed on an extension of the shaft C which can drives it directly when the housing of said turbine is substituted for the casing 6. In this case, it is the tubular member 4 which is pivotally mounted, for example as described in reference with FIg. 3, and the inlet nozzle of said centrifugal turbine is turned upwards, while the outlet nozzle or nozzles thereof are substantially horizontally placed. It is moreover possible that the cams or magnets 28, 29 and $28_1$, $29_1$ be fixed and that the micro-switches 59, 60 and $59_1$, $60_1$, be movably adjustable around the collar 27.

I claim:

1. Oscillating spraying apparatus comprising a frame, a substantially L-shaped supporting casing having a substantially vertically extending portion rotatably mounted on said frame, a bevel gear member located within said supporting casing and having an input shaft concentrically located within said portion and an output shaft at right angles thereto, means for connecting said shaft to drive means for rotation thereof in a given direction, a spraying unit mounted on the supporting casing and including a fan element connected to said output shaft, an oscillating hydraulic motor carried by said frame, means connecting said hydraulic motor to said rotatably mounted supporting casing for oscillation thereof in two directions of which one is the given rotating direction of said input shaft, means to detect the latter direction, and means for controlling said hydraulic motor, said control means including a braking member connected to said detecting means and operated thereby, whereby said spraying unit including said fan and said supporting casing are oscillated at the same speed in both directions.

2. Oscillating spraying apparatus comprising a frame, a supporting casing mounted on said frame, a bevel gear member located within said supporting casing and having an input shaft, means for connecting said input shaft to a driving unit, a tubular member mounted on said supporting casing, a second casing rotably mounted on said tubular member, a bevel gear unit located within said second casing and having an output shaft and a bevel gear member, a shaft located in said tublar member and coaxially mounted therewith for connecting the output of the bevel gear member to the input of said bevel gear unit, whereby output shaft of said bevel gear unit is rotated by said driving unit while the shaft located in the tubular member rotates in a direction given by that of the driving unit, a hub rigidly connected to said second casing and having the axis thereof aligned with the output shaft of said bevel gear unit, a fan element connected to said latter output shaft, a tubular envelope provided with spray nozzles and supported by said hub to surround said fan element, a hydraulic motor including an oscillating motor carried by said frame, means connecting said tubular member with said hydraulic motor for oscillating said second casing, and means for controlling said hydraulic motor, said control means including braking members operating in the same direction as that of the shaft located in the tubular member.

3. Apparatus as set forth in claim 1 comprising means for adjusting both the rotation angle and frequency of said hydraulic motor.

4. Apparatus as set forth in claim 1 comprising means for adjusting the inclination of the spray unit.

5. Apparatus as set forth in claim 1, wherein said L-shaped supporting casing is mounted on an inclinable support.

6. Apparatus as set forth in claim 1 wherein the driving unit comprises an engine having an output shaft connected to a bevel gear unit having an output shaft connected to the input shaft of said bevel gear member.

7. Apparatus as set forth in claim 6, comprising a cardan type coupling connecting the engine output shaft with the bevel gear unit.

8. Apparatus as set forth in claim 6, wherein the connection of bevel gear unit output shaft with the bevel gear member input shaft is adjustable in height.

9. Apparatus as set forth in claim 6, comprising a casing enclosing the bevel gear unit and mounted on a pivoting plate.

10. Apparatus as set forth in claim 9, wherein said casing comprises a pivotal sleeve concentric with the input shaft of the bevel gear member and connecting the casing of the bevel gear unit to a casing containing the bevel gear member.

11. Apparatus as set forth in claim 10, wherein each casing contains a shaft section connected to one pinion of the bevel gear contained in said casing, each shaft section having a splined end protruding from said casing and an intermediary shaft having ends constituting splined sleeves connecting said shaft sections of each casing, whereby the intermediary shaft is removable at the same time as the pivotal sleeve connecting the two casings.

12. Apparatus as set forth in claim 11, wherein both the intermediary shaft and the pivotal sleeve are constituted by telescopic elements.

13. Apparatus as set forth in claim 1, wherein the control means for said hydraulic motor comprises a three position distributor, two of the three positions of said distributor respectively corresponding to operation in both directions of the motor and the third position corresponding to stoppage of the motor whose inner circuit is then closed, whereby said motor forms a lock preventing oscillation of a pivoting section carrying the spraying unit.

14. Apparatus as set forth in claim 13, wherein a bypass circuit is placed in a reversing circuit of a supply pump for the hydraulic motor, said by-pass circuit comprising a flow adjusting device whereby the speed of the motor is adjustable to vary the oscillations transmitted to the spraying unit.

15. Apparatus as set forth in claim 13, comprising a limiting device with unidirectional operation, in the motor circuit to retard in one direction circulation of the fluid circulating in said motor, whereby compensating the couple exerted on said motor by the spraying unit when it is driven in the given direction during operation of the fan element.

16. Apparatus as set forth in claim 13 wherein the distributor of the motor has an electromagnetic control and comprises a slide normally disposed in neutral position at which the circuit of the motor is closed, said slide being movable between two working positions by two windings having a supply controlled by two microswitches in a circuit controlled by a main switch and at least one control means supported by the mobile element of a kinematic system connecting the motor to the sections of the pivotally mounted supporting casing.

17. Apparatus as set forth in claim 16 wherein one of the two micro-switches is normally closed and the other one is normally open, the normally closed micro switch supplying one of the windings of the distributor and the normally open micro switch supplying the other winding of the distributor through a polarized and self energisable inverter relay interupting supplying of the winding of the distributor which is normally supplied by the normally closed micro-switch when a pulse applied to said normally open micro switch rocks the inverter relay which is again rocked upon a control means causing opening of the normally closed micro switch.

18. Apparatus according to claim 16, wherein the control means are of a cam type.

19. Apparatus according to claim 16, wherein the micro-switches as well as the control means are of a magnetic type.

20. Apparatus according to claim 16, wherein the micro-switches are connected to a logical memory device controlled by said control means and supplying the windings of the distributor in one of two directions and in other one of said two directions.

21. Apparatus according to claim 16 comprising two micro-switches, a first micro-switch being normally closed and a second micro-switch being normally open, the first micro-contact having a terminal connected to a first reference potential and other terminal connected to one input of an OR gate, the second micro-switch having a terminal connected to a second reference potential and an other terminal connected to said first reference potential as well as to one input of and AND gate of which an other input is connected to output of the OR gate, output of said AND gate being connected to an other input of the OR gate as well as to the windings of the distributor, whereby the normally closed first micro-contact supplies the windings of the distributor in one of two directions and the normally open second micro-switch suplies the windings of the distributor in other one of said two directions shifting of one direction to the other direction being provided from one of the control means acting on one of the micro-switches.

22. Apparatus according to claim 16 comprising two micro-switches, a first micro-switch being normally open and a second micro-switch being normally closed, the first micro-switch having two terminals thereof connected to inputs of a first NAND gate, output of said first NAND gate being connected to one input of a second NAND gate having an other input connected to one hand to one input of the first NAND gate and on the other hand to a reference potential, the second micro-switch having a terminal connected to output of the second NAND gate and an other terminal connected to the input of the first NAND gate which is not connected to the reference potential, output of the first NAND gate being moreover connected to a first of the windings of the distributor and output of the second NAND gate being connected to a second of the windings of the distributor, whereby the normally open micro-switch moves the distributor in a first direction and the normally closed micro-switch moves the distributor in a second direction shifting of the first direction to the second direction being provided from one of the control means acting on one of the micro-switches.

23. Apparatus according to claim 13, wherein the output shaft of the hydraulic motor is connected by a chain to a sprocket wheel carried by the pivoting section of the spraying unit, said section also supporting a crown for supporting two cams, said cams being adjustable in position and utilized to operate two micro-switches through which the distributor is brought in both working positions.

* * * * *